US012644961B2

(12) United States Patent
Kinoshita et al.

(10) Patent No.: US 12,644,961 B2
(45) Date of Patent: Jun. 2, 2026

(54) PROCESSING APPARATUS

(71) Applicant: NEC Corporation, Tokyo (JP)

(72) Inventors: Kosuke Kinoshita, Tokyo (JP);
Takahiro Kumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 308 days.

(21) Appl. No.: 18/381,803

(22) Filed: Oct. 19, 2023

(65) Prior Publication Data

US 2024/0142570 A1 May 2, 2024

(30) Foreign Application Priority Data

Oct. 26, 2022 (JP) ................................. 2022-171376

(51) Int. Cl.
*G01S 7/28* (2006.01)
*G01S 13/90* (2006.01)
(52) U.S. Cl.
CPC ........ *G01S 7/2813* (2013.01); *G01S 13/9004* (2019.05)
(58) Field of Classification Search
CPC ........................... G01S 7/2813; G01S 13/9004
See application file for complete search history.

(56) References Cited

U.S. PATENT DOCUMENTS

| | | | | |
|---|---|---|---|---|
| 6,011,505 A | * | 1/2000 | Poehler ............... | G01S 13/9019 |
| | | | | 342/25 C |
| 2004/0131113 A1 | * | 7/2004 | Rao ........................... | H04L 1/20 |
| | | | | 375/226 |
| 2007/0047742 A1 | * | 3/2007 | Taenzer ............... | H04R 29/006 |
| | | | | 381/92 |
| 2019/0227552 A1 | * | 7/2019 | Kato .................... | G05D 1/0088 |
| 2021/0181336 A1 | * | 6/2021 | Tanaka ............... | G01S 13/9023 |
| 2022/0214441 A1 | * | 7/2022 | Labusch .............. | G01S 13/536 |

FOREIGN PATENT DOCUMENTS

JP          2007-322383 A          12/2007

* cited by examiner

*Primary Examiner* — William Kelleher
*Assistant Examiner* — Hailey R Le
(74) *Attorney, Agent, or Firm* — Sughrue Mion, PLLC

(57) ABSTRACT

A processing apparatus includes a compression unit configured to compress data by compressing at least positional information with respect to phase difference data including the positional information, and a removal unit configured to remove a noise component with respect to the data compressed by the compression unit.

8 Claims, 15 Drawing Sheets

FIRST OBSERVATION

ANALYZE A RELATIVE PHASE DIFFERENCE BETWEEN TWO REFLECTION POINTS

SECOND OBSERVATION

200

100

Fig.2
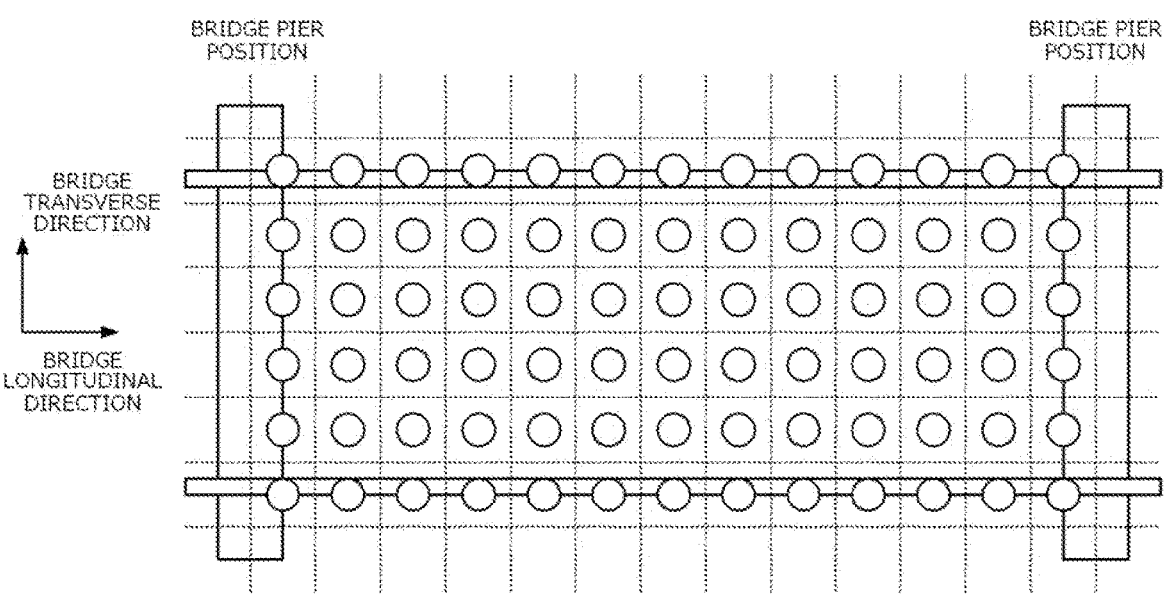
EXTRACT PS POINT
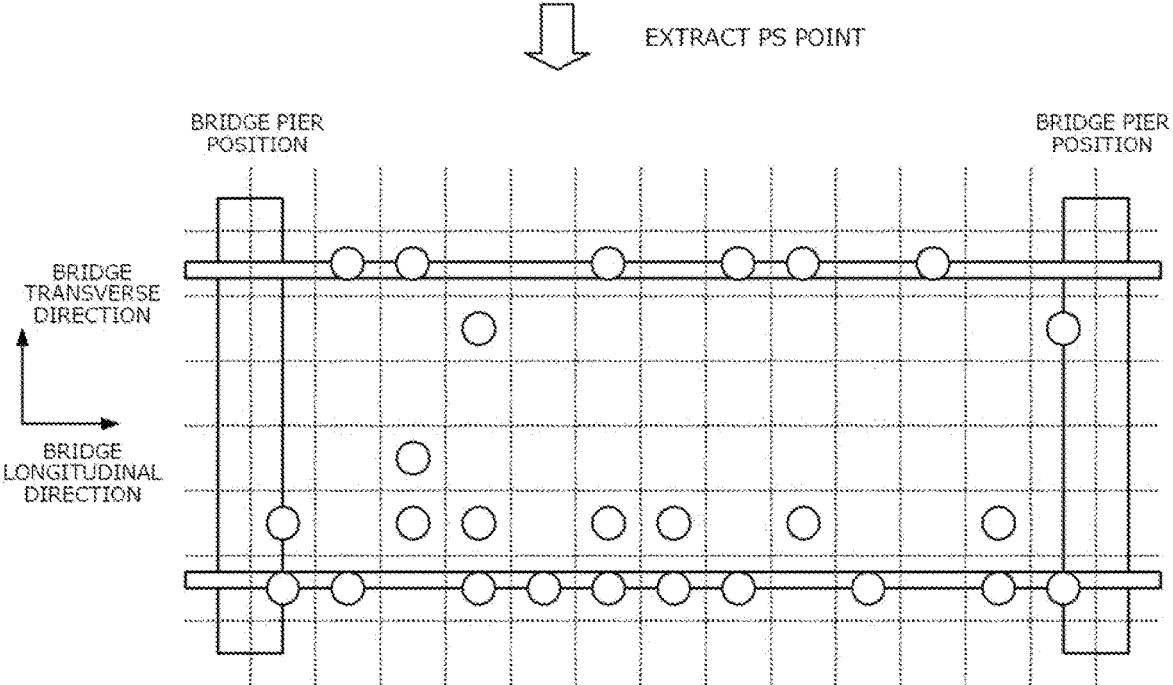

Fig.3

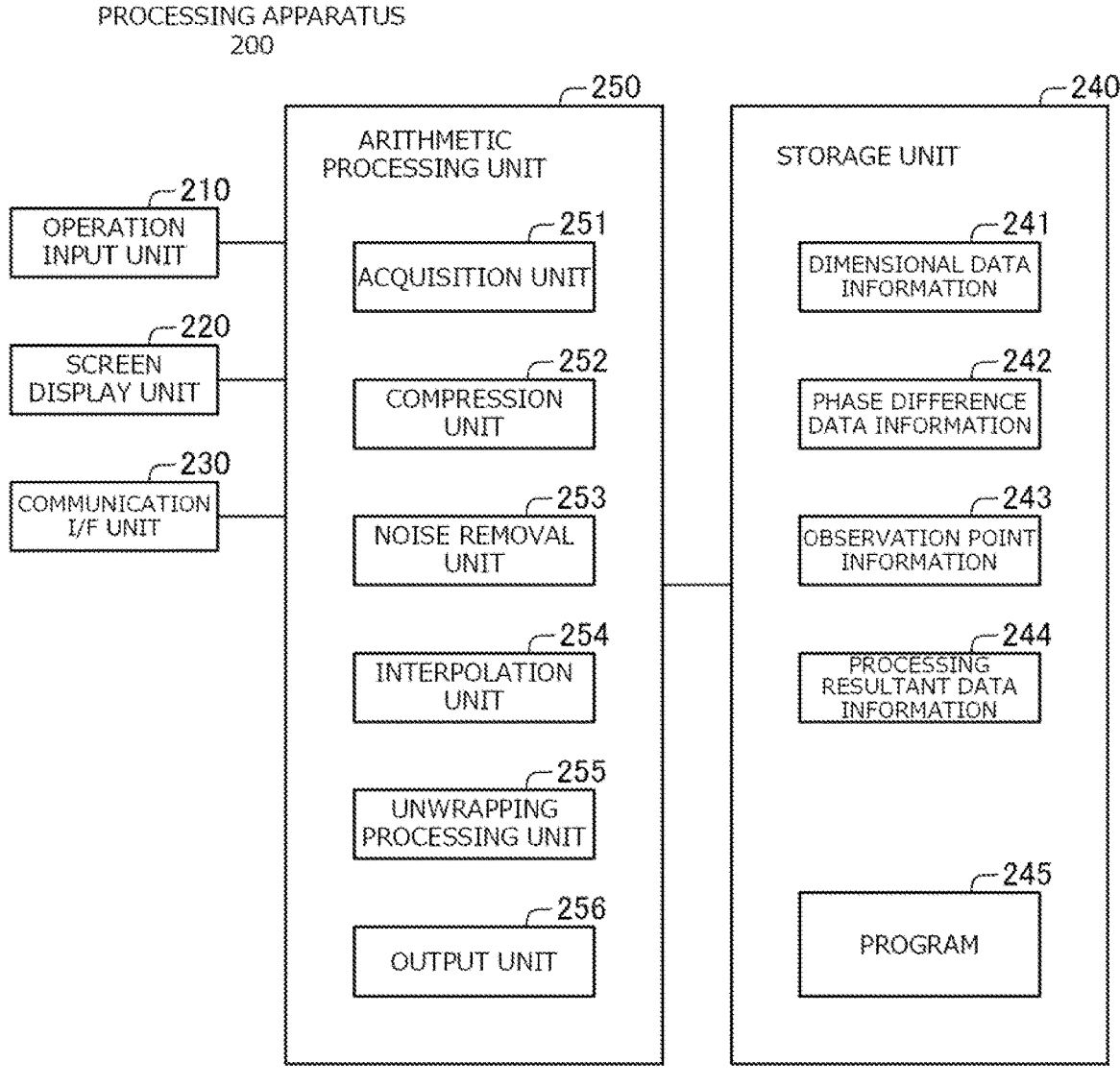

PROCESSING APPARATUS
200

ARITHMETIC PROCESSING UNIT ⌐250

STORAGE UNIT ⌐240

OPERATION INPUT UNIT ⌐210

SCREEN DISPLAY UNIT ⌐220

COMMUNICATION I/F UNIT ⌐230

ACQUISITION UNIT ⌐251

COMPRESSION UNIT ⌐252

NOISE REMOVAL UNIT ⌐253

INTERPOLATION UNIT ⌐254

UNWRAPPING PROCESSING UNIT ⌐255

OUTPUT UNIT ⌐256

DIMENSIONAL DATA INFORMATION ⌐241

PHASE DIFFERENCE DATA INFORMATION ⌐242

OBSERVATION POINT INFORMATION ⌐243

PROCESSING RESULTANT DATA INFORMATION ⌐244

PROGRAM ⌐245

Fig.7
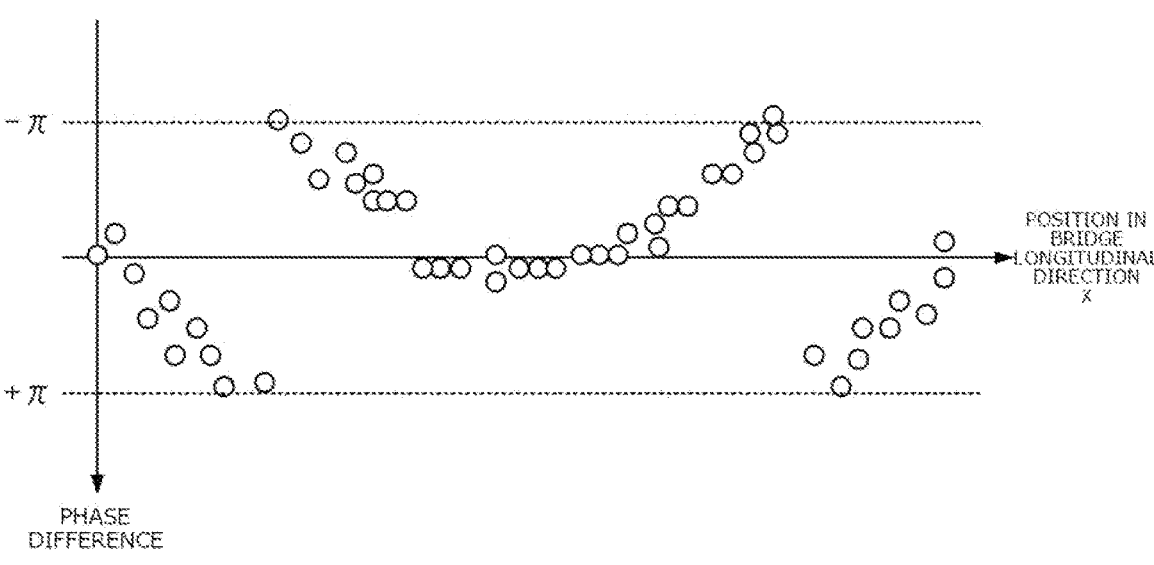
UNWRAPPING
PROCESSING
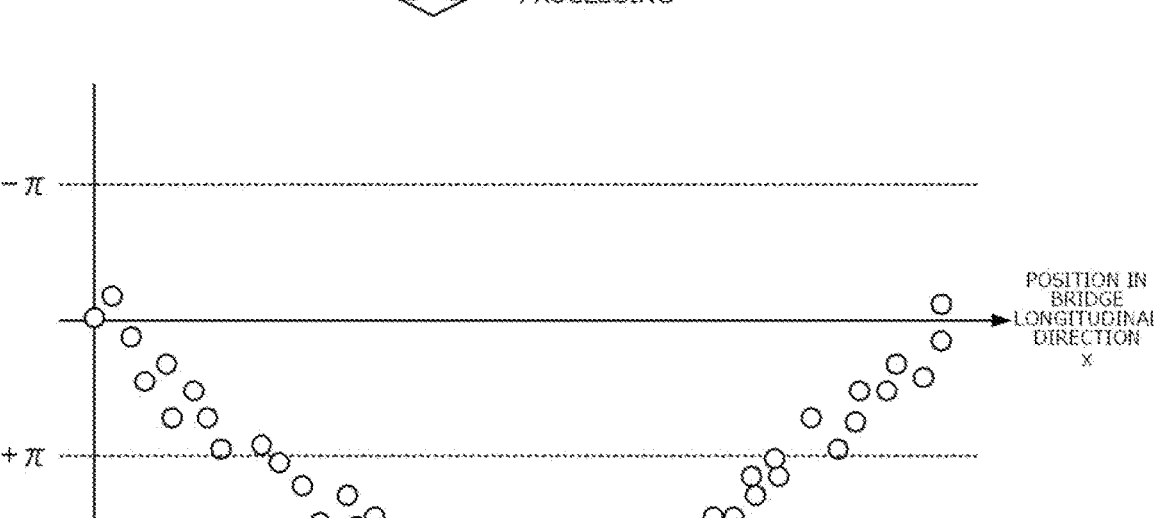

START POINT

END POINT

OBSERVATION
POINT

THRESHOLD
VALUE

○ OBSERVATION
    POINT

COMPRESS POSITIONAL INFORMATION OF SELECTED POINT
(TWO-DIMENSIONAL) INTO POSITIONAL INFORMATION ON AXIS
(ONE-DIMENSIONAL)

PROCESSING APPARATUS

CROSS-REFERENCE TO RELATED APPLICATIONS

This application is based upon and claims the benefit of priority from Japanese Patent Application No. 2022-171376 filed in Japan on Oct. 26, 2022, the disclosure of which is incorporated herein in its entirety by reference.

TECHNICAL FIELD

The present invention relates to a processing apparatus, a processing method, and a recording medium.

BACKGROUND ART

It has been known to perform processing such as a displacement analysis based on an acquired phase difference.

Examples of related techniques include Patent Literature 1. Patent Literature 1 discusses an image radar apparatus that acquires two radar images under conditions slightly different in an incident angle of a reflected wave from an observation target region, and measures the height of the terrain based on a phase difference between these radar images. According to Patent Literature 1, for example, the image radar apparatus includes a phase unwrapping means that unwraps wrapped portions of the phase difference subjected to phase compensation to connect them.

CITATION LIST

Patent Literature

[Patent Literature 1] Japanese Patent Application Laid-Open No. 2007-322383

SUMMARY OF INVENTION

Technical Problem

In a case where a phase difference generated between images is acquired by, for example, interferometric analysis of two pairs of images, a phase difference wrapped in a range of $-\pi$ to $+\pi$ is calculated in the interferometric analysis. This raises the necessity of performing unwrapping processing, which is processing for connecting wrapped phase differences, as discussed in Patent Literature 1 when analyzing a displacement or the like.

Now, the unwrapping processing attempts to connect phases adjacent to each other as smoothly as possible. Therefore, the unwrapping processing is vulnerable to a noise component, a local loss, and the like, and may fail to ensure the accuracy thereof when the phase has a large number of noise components or lost portions. In this manner, a problem has arisen in that it may be difficult to accurately perform the unwrapping processing.

In light thereof, one of objects of the present invention is to provide a processing apparatus, a processing method, and a recording medium capable of solving the above-described problem.

Solution to Problem

A processing apparatus according to one aspect of the present disclosure for achieving this object is configured to include at least one memory configured to store processing instructions; and at least one processor configured to execute the processing instructions to:

compress data by compressing at least positional information with respect to phase difference data including the positional information; and remove a noise component with respect to the compressed data.

Further, a processing method according to another aspect of the present disclosure is configured to include causing an information processing apparatus to compress data by compressing at least positional information with respect to phase difference data including the positional information, and remove a noise component with respect to the compressed data.

Further, a recording medium according to another aspect of the present disclosure is a computer-readable recording medium recording therein a program for causing an information processing apparatus to realize processing including compressing data by compressing at least positional information with respect to phase difference data including the positional information; and removing a noise component with respect to the compressed data.

Advantageous Effects of Invention

According to each of the aspects configured as described above, the problem lying as described above can be solved.

BRIEF DESCRIPTION OF DRAWINGS

FIG. 2 is a diagram illustrating one example of phase difference data.

FIG. 3 is a block diagram illustrating an example of the configuration of a processing apparatus.

FIG. 7 is a diagram for illustrating one example of unwrapping processing.

EXAMPLE EMBODIMENTS

First Example Embodiment

Figure 1:
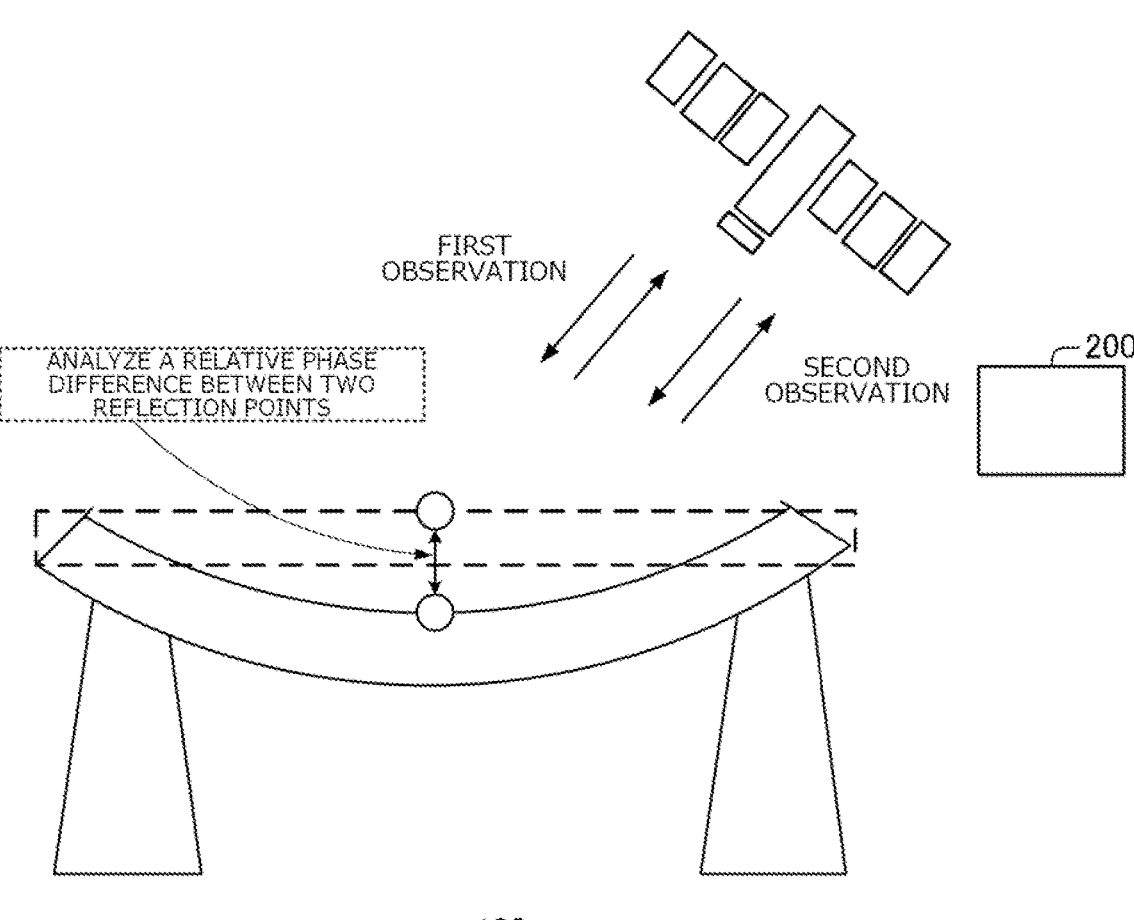
FIG. 1 is a diagram for illustrating the outline of the present disclosure.
Figure 4:
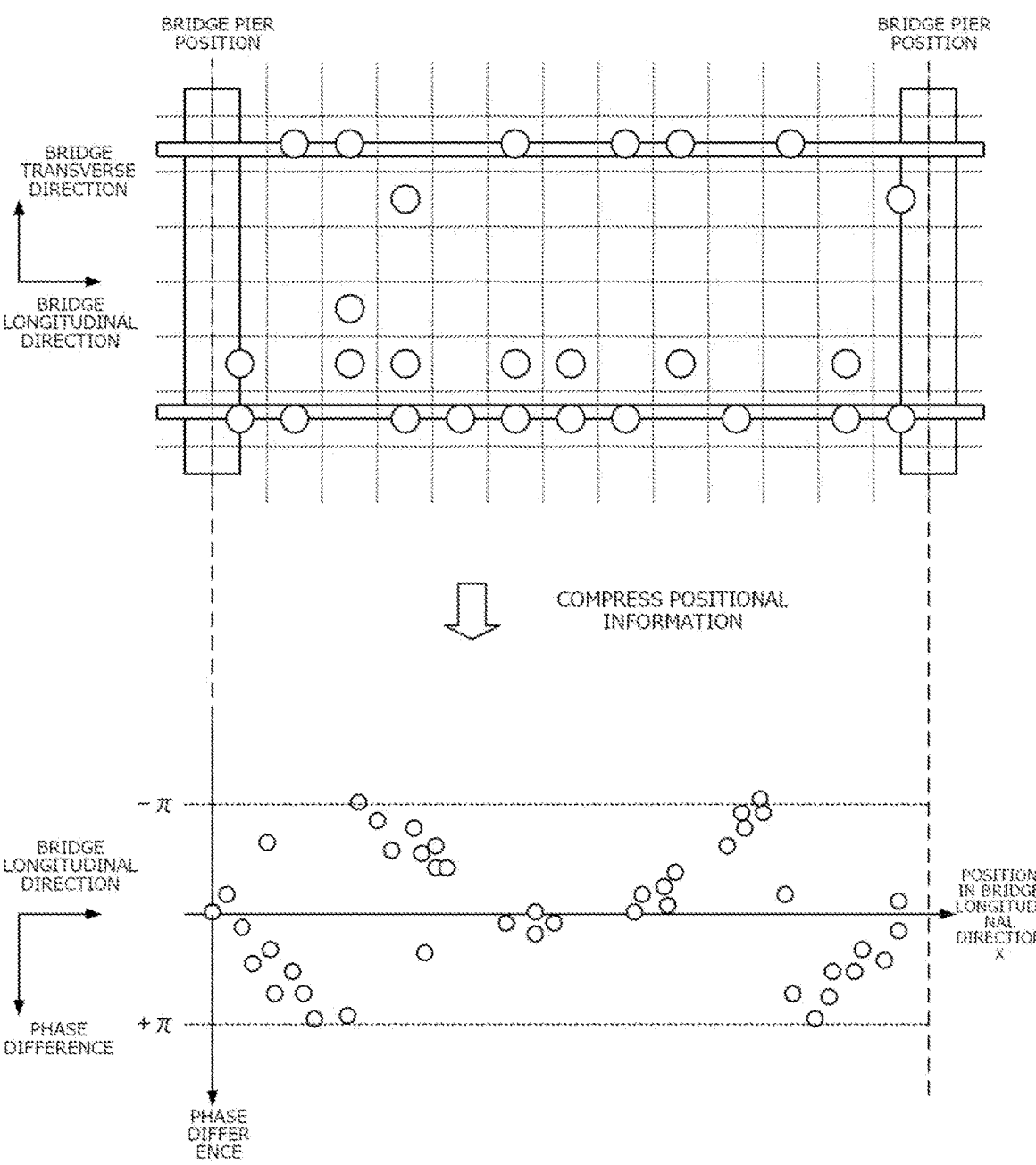
FIG. 4 is a diagram for illustrating an example of processing by a compression unit.
Figure 5:
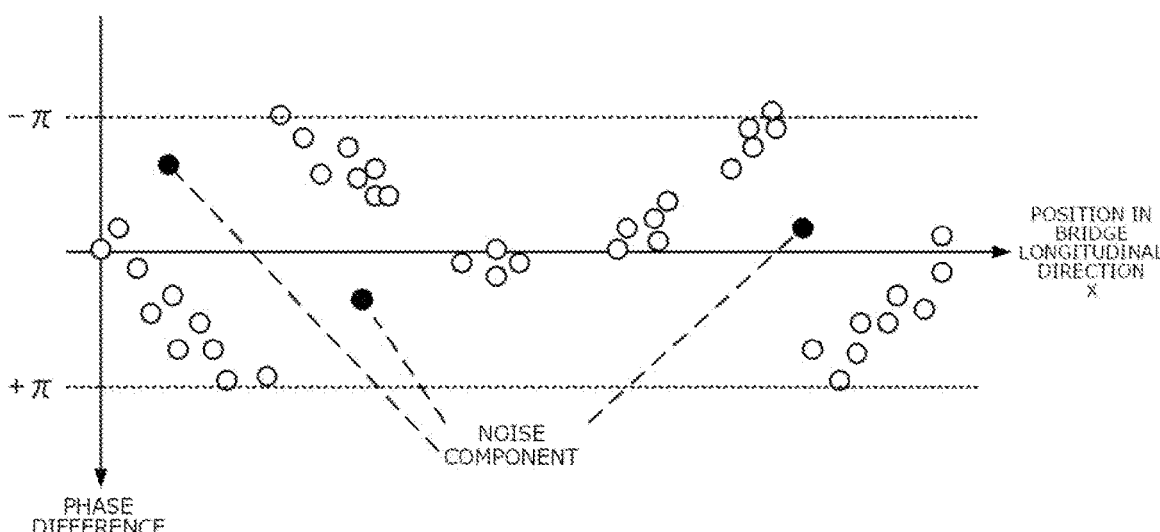
FIG. 5 is a diagram for illustrating an example of processing by a noise removal unit.
Figure 6:
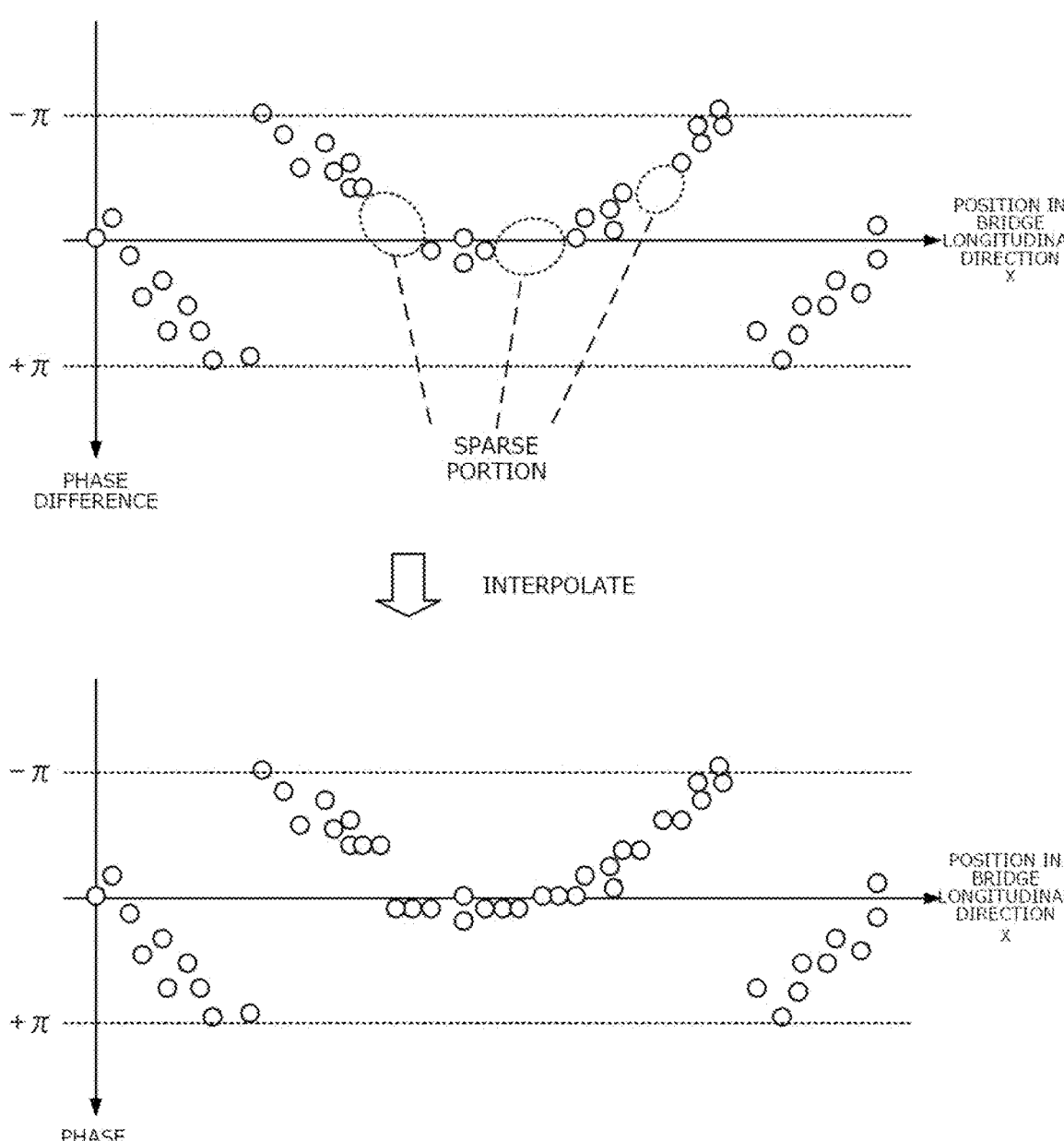
FIG. 6 is a diagram for illustrating an example of processing by an interpolation unit.
Figure 8:
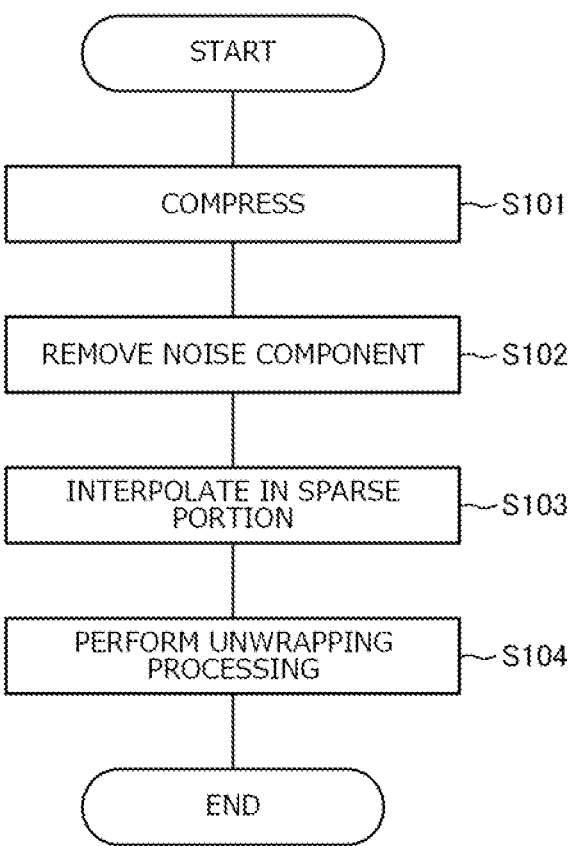
FIG. 8 is a flowchart illustrating an example of an operation of the processing apparatus.

A first example embodiment of the present disclosure will be described with reference to FIGS. 1 to 13. FIG. 1 is a diagram for illustrating the outline of the present disclosure. FIG. 2 is a diagram illustrating one example of phase difference data. FIG. 3 is a block diagram illustrating an example of the configuration of a processing apparatus 200. FIG. 4 is a diagram for illustrating an example of processing by a compression unit 252. FIG. 5 is a diagram for illustrating an example of processing by a noise removal unit 253. FIG. 6 is a diagram for illustrating an example of processing by an interpolation unit 254. FIG. 7 is a diagram for illustrating one example of unwrapping processing. FIG. 8 is a flowchart illustrating an example of an operation of the processing apparatus 200. FIGS. 9 to 13 are diagrams for illustrating examples of processing by the compression unit 252 in a case where an analysis target has various shapes.

The first example embodiment of the present disclosure will be described with respect to a processing system 100 including the processing apparatus 200 that performs unwrapping processing after performing predetermined pre-processing on phase difference data in a state of being wrapped in a range of $-\pi$ to $+\pi$. For example, the processing apparatus 200 performs predetermined compression processing, noise removal processing, and data interpolation processing as the pre-processing, as will be described below. After that, the processing apparatus 200 performs the unwrapping processing, which is processing for connecting wrapped phase differences.

In the case of the present disclosure, the processing apparatus 200 can perform the unwrapping processing when, for example, analyzing a displacement using a SAR (Synthetic Aperture Radar) image of a bridge that is an analysis target. For example, the processing system 100 generates a plurality of SAR images having reflection intensity and phase information based on, for example, radio waves reflected from a satellite, as exemplarily illustrated in FIG. 1. Then, the processing system 100 calculates the phase difference data in the state of being wrapped in the range of $-\pi$ to $+\pi$ by interferometric analysis of two pairs of images captured at different times.

More specifically, as exemplarily illustrated in FIG. 2, the processing system 100 calculates the phase difference data corresponding to each pixel in the SAR image by interferometric analysis of two pairs of images captured at different times. For example, in the example illustrated in FIG. 2, white circles indicating observation points each have the phase difference data. In other words, the processing system 100 calculates phase difference data corresponding to observation points densely arranged in a grid-like manner that includes positional information in a bridge longitudinal direction and a bridge transverse direction by interferometric analysis of two pairs of images. Further, the phase difference data corresponding to the observation points densely arranged in a grid-like manner like the above-described example may contain a noise component due to an obstacle or the like. In light thereof, the processing system 100 extracts a PS (Persistent Scatterer) point, which is a pixel that provides a statistically stable phase difference, from the phase difference data corresponding to the observation points densely arranged in a grid-like manner as illustrated in FIG. 2. The processing apparatus 200 that will be described in the present disclosure can perform the unwrapping processing after performing the pre-processing on the phase difference data corresponding to the PS point that includes the positional information as described above. The processing for calculating the phase difference data based on the SAR image and/or the processing for extracting the PS point may be performed by an external apparatus communicably connected to the processing apparatus 200 included in the processing system 100 or may be performed by the processing apparatus 200. Further, the processing for calculating the phase difference data and/or the processing for extracting the PS point may be realized using a known method.

In a case where a long thin structure like the above-described bridge is set as the observation target, it can be hypothetically assumed that phase differences in the bridge transverse direction have similar values. In light thereof, the processing apparatus 200 performs the noise removal processing and the data interpolation processing after compressing the positional information such as discarding the information in the bridge transverse direction in the positional information including the bridge transverse direction and the bridge longitudinal direction. Such processing allows the processing apparatus 200 to remove noise after making it further easy to distinguish a noise component by utilizing such tendency that PS points having similar phase differences and positional information according to the above-described hypothetical assumption are densely located in an axial direction such as the bridge longitudinal direction. Note that the analysis target does not necessarily have to be a structure complying with the hypothetical assumption made as described above, as will be described below.

The processing apparatus 200 is an information processing apparatus that performs the unwrapping processing after performing the predetermined pre-processing. FIG. 3 illustrates an example of the configuration of the processing apparatus 200. Referring to FIG. 3, the processing apparatus 200 includes, for example, an operation input unit 210, a screen display unit 220, a communication OF unit 230, a storage unit 240, and an arithmetic processing unit 250 as main constituent elements thereof.

Note that FIG. 3 illustrates an example in which the functions as the processing apparatus 200 are realized using one information processing apparatus. However, the processing apparatus 200 may be realized using a plurality of information processing apparatuses, like, for example, being realized on a cloud. Further, the processing apparatus 200 may be unequipped with a part of the above-described exemplary configuration, like, for example, being unequipped with the operation input unit 210 and/or the screen display unit 220, or may have a configuration different from the above-described exemplary configuration.

The operation input unit 210 is configured of an operation input device such as a keyboard and/or a mouse. The operation input unit 210 detects an operation of an operator operating the processing apparatus 200 and outputs it to the arithmetic processing unit 250.

The screen display unit 220 is configured of a screen display device such as an LCD (a Liquid Crystal Display). The screen display unit 220 can display various kinds of information stored in the storage unit 240 on the screen according to an instruction from the arithmetic processing unit 250.

The communication OF unit 230 is configured of a data communication circuit or the like. The communication I/F unit 230 carries out data communication between the processing apparatus 200 and an external apparatus connected via a communication line.

The storage unit 240 is a storage device such as a hard disk or a memory. The storage unit 240 stores processing information required for various kinds of processing by the arithmetic processing unit 250, and a program 245 therein. The program 245 realizes various kinds of processing units by being read in and executed by the arithmetic processing unit 250. The program 245 is read in from an external apparatus or a recording medium in advance via a data input/output function such as the communication OF unit 230, and is stored in the storage unit 240. Examples of main information stored in the storage unit 240 include dimensional data information 241, phase difference information 242, observation point data information 243, and processing resultant data information 244.

The dimensional data information 241 includes information regarding the analysis target. As one example, the dimensional data information 241 includes information regarding the dimensions of the bridge set as the analysis target in the present disclosure, such as the bridge length, the effective span length, the width, and the bridge pier position. For example, the dimensional data information 241 is acquired in advance using a method such as acquiring it from an external apparatus via the communication IN unit 230 or inputting it using the operation input unit 210, and is stored in the storage unit 240.

The phase difference data information 242 includes the phase difference data at the above-described PS point. In other words, the phase difference data information 242 includes the phase difference data corresponding to the PS point that includes the positional information in the bridge longitudinal direction and the bridge transverse direction. For example, the phase difference data information 242 is acquired in advance using a method such as acquiring it from an external apparatus via the communication IN unit 230 or inputting it using the operation input unit 210, and is stored in the storage unit 240. The processing apparatus 200 itself may calculate the phase difference data information 242 by, for example, interferometric analysis of two pairs of images by itself.

The observation point data information 243 includes information regarding the observation point. As one example, the observation point data information 243 includes information for identifying the position of the observation point such as the latitude and the longitude of the observation point. For example, the observation point data information 243 is acquired in advance using a method such as acquiring it from an external apparatus via the communication OF unit 230 or inputting it using the operation input unit 210, and is stored in the storage unit 240.

The processing resultant data information 244 includes the phase difference data subjected to the unwrapping processing by an unwrapping processing unit 255, which will be described below. For example, the processing resultant data information 244 is undated according to, for example, execution of the unwrapping processing by the unwrapping processing unit 255.

The arithmetic processing unit 250 includes an arithmetic device such as a CPU (Central Processing Unit) and a peripheral circuit thereof. The arithmetic processing unit 250 reads in the program 245 from the storage unit 240 and executes it, thereby causing the above-described hardware and the program 245 to cooperate with each other to realize the various kinds of processing units. Examples of main processing units realized by the arithmetic processing unit 250 include an acquisition unit 251, a compression unit 252, a noise removal unit 253, an interpolation unit 254, the unwrapping processing unit 255, and an output unit 256.

Note that the arithmetic processing unit 250 may, for example, include a GPU (Graphic Processing Unit), a DSP (Digital Signal Processor), an MPU (Micro Processing Unit), an FPU (Floating point number Processing Unit), a PPU (Physics Processing Unit), a TPU (Tensor Processing Unit), a quantum processor, or a micro controller, or a combination thereof, instead of the above-described CPU.

The acquisition unit 251 acquires the phase difference data corresponding to the PS point that includes the positional information from an external apparatus or the like. Further, the acquisition unit 251 stores the acquired data into the storage unit 240 as the phase difference data 242.

Note that the acquisition unit 251 may acquire the phase difference data corresponding to the PS point that includes the positional information by conducting an interferometric analysis or performing processing for extracting the PS point on the pair of images acquired from an external apparatus or the like instead of acquiring the data from an external apparatus or the like.

The compression unit 252 compresses the phase difference data included in the phase difference data information 242. For example, the compression unit 252 compresses the above-described data by compressing at least the positional information in the phase difference data included in the phase difference data information 242.

For example, the compression unit 252 extracts data corresponding to a portion to be analyzed in the phase difference data included in the phase difference data information 242 based on the dimensional data information 241, the phase difference data information 242, and the observation point data information 243. As one example, the compression unit 252 extracts the data for each unit that is determinable to be one block of structure such as a portion of the bridge within the span sandwiched by bridge piers.

Further, the compression unit 252 performs the compression processing based on the extracted data. For example, the compression unit 252 compresses at least the positional information in the extracted phase difference data. As one example, the compression unit 252 compresses the positional information by discarding the positional information in the bridge transverse direction and associating the position in the bridge longitudinal direction with the phase difference data as exemplarily illustrated in FIG. 4. In other words, the compression unit 252 compresses the data by converting an observation point having the phase difference data that exists in a two-dimensional space into a point on the bridge longitudinal axis. Note that the position in the bridge longitudinal direction may be, for example, the position of the observation point on the bridge longitudinal axis assuming that the origin is placed at one of the bridge piers.

Further, the compression unit 252 may be configured to extract again the phase difference data corresponding to a PS point present on an arbitrary axis such as the bridge longitudinal axis or an edge axis in the extracted phase difference data after extracting the data for each unit determinable to be one block of structure. In other words, the compression unit 252 may be configured to extract again the phase difference data held by an observation point located in such a manner that the distance between the axis and the observation point falls within a predetermined threshold value. In this case, the compression unit 252 can compress the positional information with respect to the phase difference data extracted again. Further, the compression unit 252 may be configured to select the axis targeted for the extraction. For example, the compression unit 252 may be configured to select the axis targeted for the extraction so as to increase PS points targeted for the extraction as much as possible.

The noise removal unit 253 removes the noise component with respect to the phase difference data with the positional information thereof compressed by the compression unit 252. Now, the noise component refers to, for example, an outlier generated due to an observation error or the like. For example, the noise removal unit 253 determines an outlier satisfying a predetermined condition by using a statistical method and removes the determined outlier as the noise component as exemplarily illustrated in FIG. 5.

As one example, the noise removal unit 253 may remove the noise component by utilizing a method such as density-based clustering. For example, the noise removal unit 253 determines an outlier satisfying a condition of not belonging to each cluster by grouping a portion dense as points as a cluster in the phase difference data like the example illustrated in FIG. 5. Then, the noise removal unit 253 removes the determined outlier as the noise component. Note that the noise removal unit 253 may determine the outlier using a statistical method different from the above-described example to remove the determined outlier. For example, the noise removal unit 253 may calculate a value such as a moving average or a dispersion and determine an outlier satisfying a predetermined condition based on the calculated result.

The interpolation unit 254 determines a portion in which the data is sparse in the bridge longitudinal direction in the phase difference data with the noise component removed therefrom by the noise removal unit 253 and interpolates in the determined sparse portion. For example, the interpolation unit 254 determines the sparse portion based on the distribution of the phase difference data. Further, the interpolation unit 254 can perform the interpolation processing using a method such as nearest neighbor interpolation, linear interpolation, or spline interpolation.

For example, as exemplarily illustrated in FIG. 6, a portion in which predetermined section data is absent in the bridge longitudinal direction or a sparse portion at a density equal to or lower than a threshold value is present in the phase difference data with the noise component removed therefrom by the noise removal unit 253. Therefore, the interpolation unit 254 determines the sparse portion based on how far pieces of data are separated from each other in the bridge longitudinal direction, the density, or the like. For example, the interpolation unit 254 can determine that, when the distance in the bridge longitudinal direction between pieces of phase difference data adjacent to each other exceeds a predetermined value in some portion, this portion is the sparse portion. The interpolation unit 254 may determine that, for example, when the density in the bridge longitudinal direction is equal to or lower than a predetermined value in some portion, this portion is the sparse portion. The interpolation unit 254 may determine the sparse portion using another arbitrary method. Further, the interpolation unit 254 performs the interpolation processing such as the nearest neighbor interpolation with respect to the determined sparse portion. In other words, the interpolation unit 254 performs the interpolation processing that adds the phase difference data to the sparse portion as exemplarily illustrated in FIG. 6. For example, when conducting the nearest neighbor interpolation, the interpolation unit 254 adds data having the same phase difference as adjacent data.

In this manner, the interpolation unit 254 determines the portion in which the data is sparse in the bridge longitudinal direction and interpolates in the determined sparse portion. Note that the sparse portion emerges because, for example, the observation has failed for some reason and the phase data cannot be acquired. For example, in the case of the SAR image, the sparse portion emerges at a portion where the radio wave cannot be normally reflected on the analysis target and the PS point cannot be acquired.

Employing interpolation processing for smoothly connecting points, such as the linear interpolation or the spline interpolation, necessitates avoiding a connection at a phase turnaround portion. For this reason, the interpolation unit 254 may be configured to determine the turnaround portion by an arbitrary method and refrain from adding data to a portion determined to be the turnaround portion. For example, pieces of data adjacent to each other have a phase difference close to $2\pi$ therebetween in the turnaround portion. Therefore, the interpolation unit 254 may determine the turnaround portion based on an arbitrary reference such as whether pieces of data adjacent to each other have a phase difference equal to or greater than a threshold value.

Further, the interpolation unit 254 may be configured to determine the method for performing the interpolation processing based on, for example, the density in the data. For example, the interpolation unit 254 may be configured to conduct the linear interpolation or the spline interpolation if the density in the data is equal to or higher than a predetermined value while conducting the nearest neighbor interpolation if the density in the data is lower than the predetermined value. The interpolation unit 254 may determine the method for performing the interpolation processing based on a condition different from the above-described example.

The unwrapping processing unit 255 performs the unwrapping processing, which is processing for connecting wrapped phase differences, with respect to the data subjected to the interpolation processing by the interpolation unit 254. Further, the unwrapping processing unit 255 stores the data subjected to the unwrapping processing into the storage unit 240 as the processing resultant data information 244.

For example, the unwrapping processing unit 255 calculates values acquired by shifting certain phase difference data by $+2\pi$ and $-2\pi$, respectively. Further, the unwrapping processing unit 255 compares each of the original value and the values acquired by shifting the certain phase difference data by $+2\pi$ and $-2\pi$, respectively, with data adjacent to the certain phase difference data that is used as a comparison target. Then, the unwrapping processing unit 255 selects a value having the smallest difference from the value of the data used as the comparison target among the above-described three values. For example, the unwrapping processing unit 255 naturally connects the wrapped phases as exemplarily illustrated in FIG. 7 by repeating the selection made as described above.

The output unit 256 outputs the processing resultant data information 244 and the like. For example, the output unit 256 may, for example, transmit the processing resultant data information 244 and the like to an external apparatus via the communication OF unit 230 or display the processing resultant data information 244 and the like on the screen display unit 220. Further, the output unit 256 may output, for example, a value acquired by converting the phase difference after the unwrapping into a displacement value based on a radar wavelength used when the SAR image is acquired.

This is an example of the configuration of the processing apparatus 200. Subsequently, an example of an operation of the processing apparatus 200 will be described with reference to FIG. 8.

FIG. 8 is a flowchart illustrating the example of the operation of the processing apparatus 200. Referring to FIG. 8, the compression unit 252 compresses the phase difference data included in the phase difference data information 242 (step S101). For example, the compression unit 252 compresses the above-described data by compressing at least the positional information in the phase difference data included in the phase difference data information 242.

The noise removal unit 253 removes the noise component with respect to the phase difference data with the positional information thereof compressed by the compression unit 252 (step S102). For example, the noise removal unit 253 determines the outlier using a statistical method and removes the determined outlier as the noise component.

The interpolation unit 254 determines the portion in which the data is sparse in the bridge longitudinal direction in the phase difference data with the noise component removed therefrom by the noise removal unit 253 and interpolates in the determined sparse portion (step S103). The interpolation unit 254 may perform the interpolation processing using a method such as the nearest neighbor interpolation, the linear interpolation, or the spline interpolation.

The unwrapping processing unit 255 performs the unwrapping processing, which is processing for connecting wrapped phase differences, with respect to the data subjected to the interpolation processing by the interpolation unit 254 (step S104).

In this manner, the processing apparatus 200 includes the compression unit 252 and the noise removal unit 253. According to such a configuration, the noise removal unit 253 can remove the noise component with respect to the phase difference data with the positional information thereof compressed by the compression unit 252. As a result, the noise component can be further accurately removed. Due to that, the accuracy can be improved when the unwrapping processing is performed.

Further, the processing apparatus 200 includes the noise removal unit 253 and the interpolation unit 254. According to such a configuration, the interpolation unit 254 can perform the interpolation processing with respect to the phase difference data with the noise component removed therefrom by the noise removal unit 253. As a result, the possibility of performing the interpolation processing based on the noise component can be reduced. Due to that, the accuracy can be improved when the unwrapping processing is performed.

The present disclosure has been described assuming that the analysis target is a bridge, which is a long thin structure, by way of example. However, the analysis target may be a long thin structure different from a bridge, such as an elevated road, a rail track, and a runway. In this case, the shape in the longitudinal direction may be a straight line or may be a curved line. Further, the analysis target may be an object different from a long thin structure. For example, the analysis target may be even a component of a structure, a ground surface, a wall, a plant, a liquid level, and the like besides a structure including a building, a vehicle, an airplane, a ship, and a device. For example, the processing apparatus 200 may perform the unwrapping processing for, for example, detecting an anomalous displacement occurring in a structure, understanding the growth/distribution of vegetation, or understanding a rise/drop of a liquid level (a sea level or the like). Further, the processing apparatus 200 may be configured to also perform the unwrapping processing after performing similar pre-processing with respect to the phase difference data calculated based on data different from a SAR image.

FIGS. 9 to 13 are diagrams for illustrating examples of processing by the compression unit 252 in the case where the analysis target has various shapes. For example, the compression unit 252 can be configured to compress the positional information by selecting one arbitrary axis and converting an observation point in a multidimensional space defined by one or more dimensions into a point on the axis.

Figure 9:
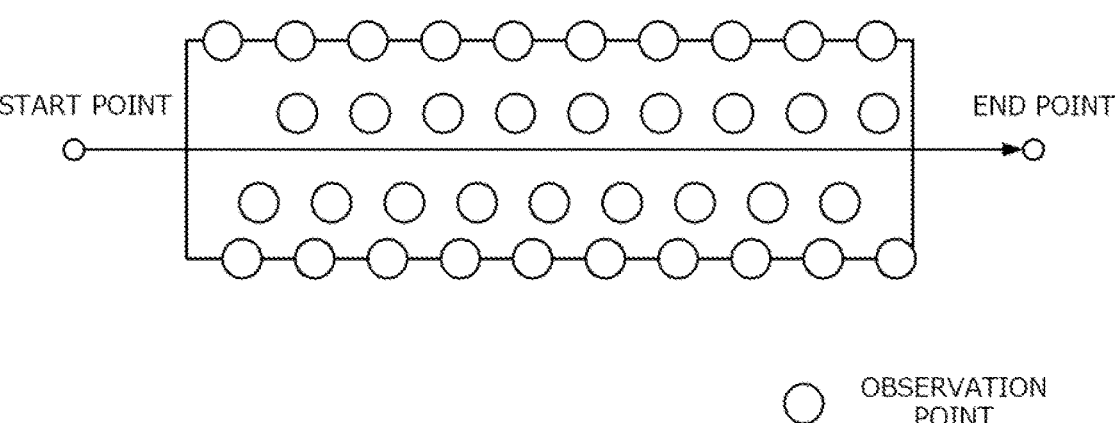
FIG. 9 is a diagram for illustrating an example of processing by the compression unit in a case where an analysis target has various shapes.
Figure 10:
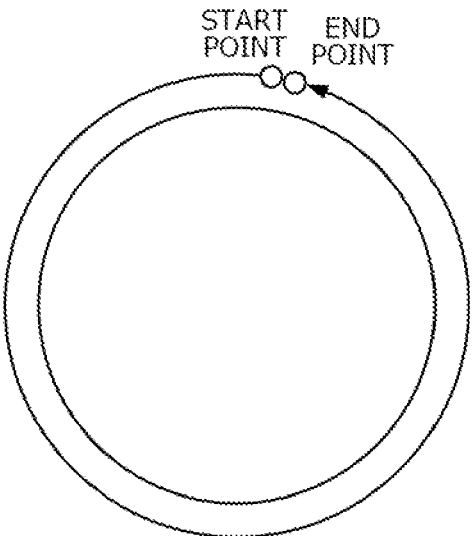
FIG. 10 is a diagram for illustrating an example of the processing by the compression unit in the case where the analysis target has various shapes.
Figure 11:
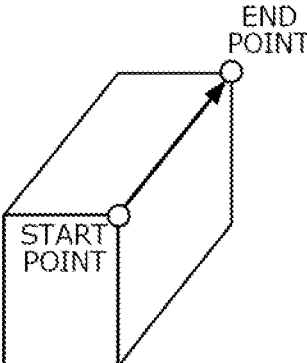
FIG. 11 is a diagram for illustrating an example of the processing by the compression unit in the case where the analysis target has various shapes.

Now, as exemplarily illustrated in FIG. 9, the axis refers to a line defined by determining a start point and an end point at arbitrary positions and connecting the start point and the end point in the longitudinal direction or the edge direction of the analysis target, a direction in which a variance is high in the distribution in which observation points are located, or the like. For example, as exemplarily illustrated in FIG. 10, the compression unit 252 may select an axis extending in the edge direction in a case where the analysis target is, for example, circular. Alternatively, for example, as exemplarily illustrated in FIG. 11, the compression unit 252 may select an axis extending in the edge direction in a case where the analysis target has a three-dimensional shape. Note that the line may be a curved line without being limited to a straight line, and may be a line extending through any route between the start point to the end point.

Figure 12:
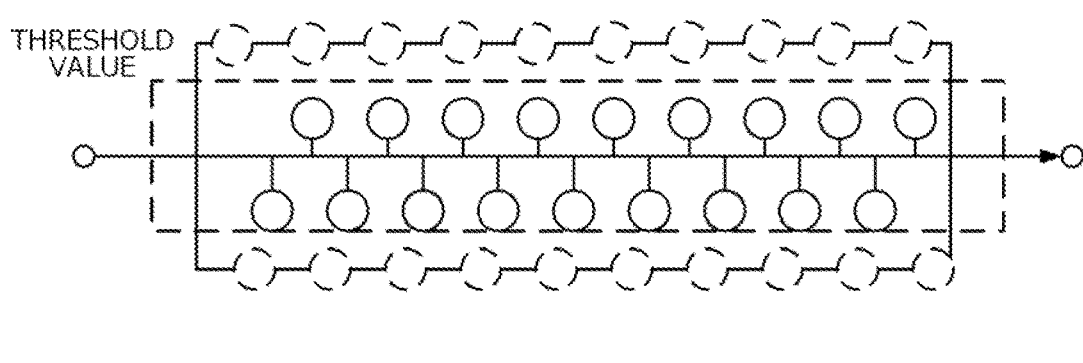
FIG. 12 is a diagram for illustrating an example of the processing by the compression unit in the case where the analysis target has various shapes.
Figure 13:
FIG. 13 is a diagram for illustrating an example of the processing by the compression unit in the case where the analysis target has various shapes.

Further, in the processing for compressing the positional information by converting the observation point into the point on the axis, for example, the processing apparatus 200 extracts only an observation point falling below a preset threshold value in a distance connecting the point on the axis and the observation point as exemplarily illustrated in FIG. 12. Then, the processing apparatus 200 converts the observation point into the point on the axis by adding the distance on the axis between the point on the axis that is connected to the extracted observation point and the start point to the observation point as new positional information. As a result, the positional information of each observation point (two-dimensional) can be compressed into positional information on the axis (one dimension) as exemplarily illustrated in FIG. 13. Note that the processing apparatus 200 may use a plurality of points on the axis without being limited to using one point for one observation point. Further, the distance connecting the point on the axis and the observation point may be, for example, the shortest distance or a perpendicular line that can be drawn from the axis to the observation point. Further, the threshold value is a preset value of an allowable distance. The threshold value may be a predetermined constant value or may be variable depending on a position on the axis.

Second Example Embodiment

Figure 14:
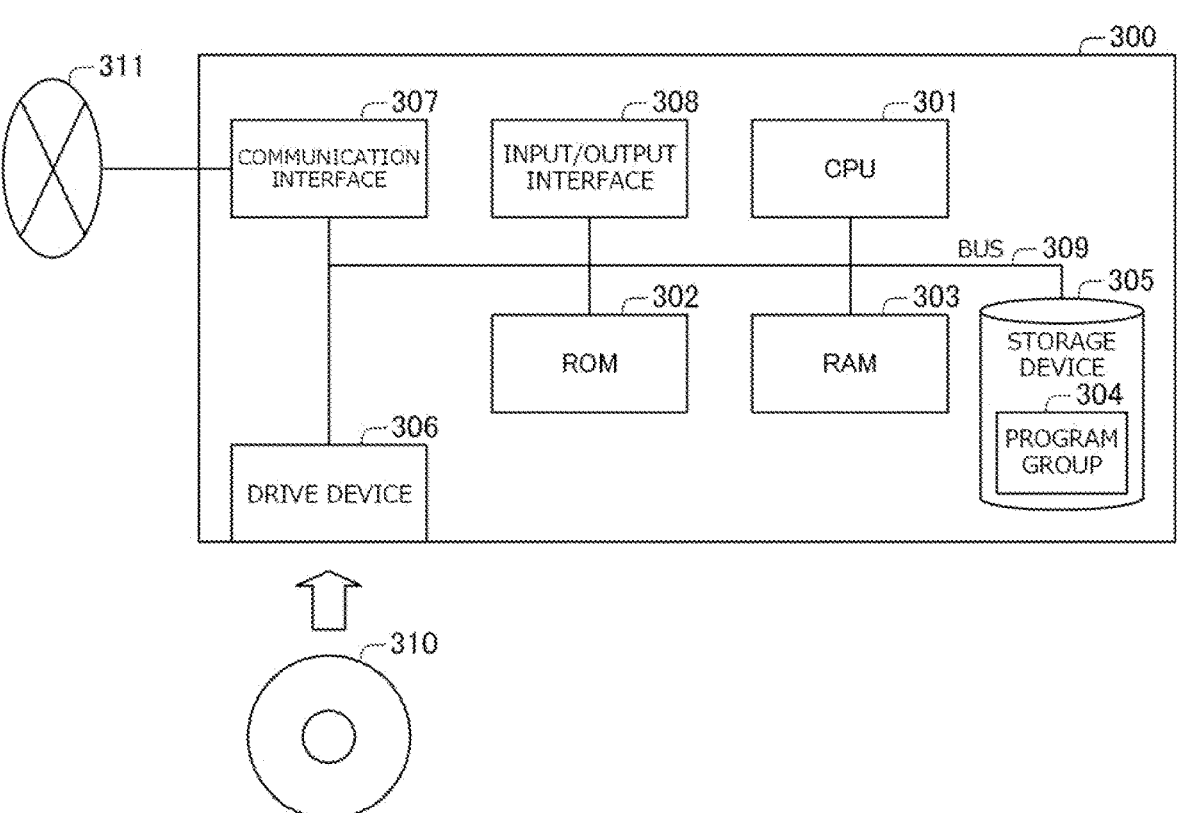
FIG. 14 is a diagram illustrating an example of the hardware configuration of a processing apparatus according to a second example embodiment of the present disclosure.
Figure 15:
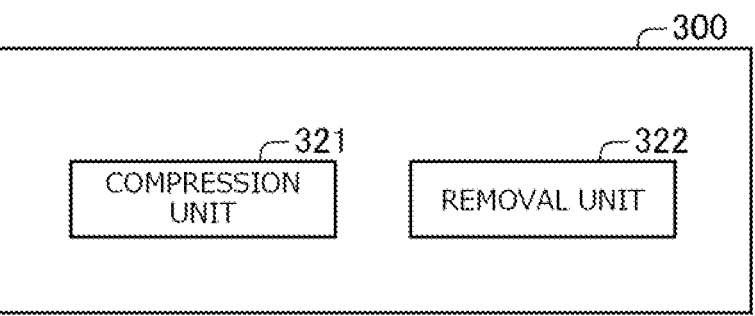
FIG. 15 is a block diagram illustrating an example of the configuration of the processing apparatus.

Next, a second example embodiment of the present disclosure will be described with reference to FIGS. 14 and 15. FIG. 14 is a diagram illustrating an example of the hardware configuration of a processing apparatus 300. FIG. 15 is a block diagram illustrating an example of the configuration of the processing apparatus 300.

The second example embodiment of the present disclosure will be described with respect to an example of the configuration of the processing apparatus 300 as an information processing apparatus that performs the unwrapping processing, which is processing for connecting wrapped phase differences. FIG. 14 illustrates an example of the hardware configuration of the processing apparatus 300. Referring to FIG. 14, the processing apparatus 300 has the following hardware configuration as one example.

CPU (Central Processing Unit) 301 (arithmetic device)

ROM (Read Only Memory) 302 (storage device)

RAM (Random Access Memory) 303 (storage device)

Program group 304 that is loaded into the RAM 103

Storage device 305 storing the program group 304 therein

Drive device 306 that reads and writes data out of and into a recording medium 310 outside the information processing apparatus Communication interface 307 connected to a communication network 311 outside the information processing apparatus Input/output interface 308 that inputs and outputs data Bus 309 connecting each constituent element Further, the processing apparatus 300 can realize functions as a compression unit 321 and a removal unit 322 illustrated in FIG. 15 through acquisition of the program group 304 by the CPU 301 and execution thereof by this CPU 301. Note that the program group 304 is, for example, stored in the storage device 305 or the ROM 302 in advance, and loaded to the RAM 303 or the like and executed by the CPU 301 as needed. Alternatively, the program group 304 may be supplied to the CPU 301 via the communication network 311 or may be stored in the recording medium 310 in advance and read out by the drive device 306 and supplied to the CPU 301.

Note that FIG. 15 illustrates an example of the hardware configuration of the processing apparatus 300. The hardware configuration of the processing apparatus 300 is not limited to the above-described example. For example, the processing apparatus 300 may be configured of a part of the above-described configuration, such as a configuration not including the drive device 306. Further, the CPU 301 may be, for example, a GPU exemplarily described in the first example embodiment.

The compression unit 321 compresses the data by compressing at least the positional information in the phase difference data including the positional information.

The removal unit 322 removes the noise component with respect to the data compressed by the compression unit 321.

In this manner, the processing apparatus 300 includes the compression unit 321 and the removal unit 322. According to such a configuration, the removal unit 322 can remove the noise component with respect to the data compressed by the compression unit 321. As a result, the noise component can be further appropriately removed. Due to that, the accuracy can be improved when the unwrapping processing is performed.

Note that the above-described processing apparatus 300 can be realized by incorporating a predetermined program into an information processing apparatus such as this processing apparatus 300. More specifically, a program according to another example embodiment of the present invention is a program for causing an information processing apparatus such as the processing apparatus 300 to realize the processing including compressing the data by compressing at least the positional information with respect to the phase difference data including the positional information, and removing the noise component with respect to the compressed data.

Further, a processing method performed by an information processing apparatus such as the above-described processing apparatus 300 is a method for causing the information processing apparatus such as the processing apparatus 300 to compress the data by compressing at least the positional information with respect to the phase difference data including the positional information, and remove the noise component with respect to the compressed data.

Even the invention of the program or a computer-readable recording medium recording the program, or the processing method configured in the above-described manner can also bring about functions and advantageous effects equivalent to the above-described processing apparatus 300, thereby achieving the above-described object of the present disclosure.

<Supplementary Notes>

A part or whole of the above-described example embodiments can also be described as, but not limited to, the following supplementary notes. Hereinafter, the outlines of a processing apparatus and the like according to the present invention will be described. However, the present invention is not limited to the following configurations.

(Supplementary Note 1)

A processing apparatus comprising:

a compression unit configured to compress data by compressing at least positional information with respect to phase difference data including the positional information; and a removal unit configured to remove a noise component with respect to the data compressed by the compression unit.

(Supplementary Note 2)

The processing apparatus according to supplementary note 1, wherein the compression unit compresses the data by converting an observation point present in a multidimensional space into a point on a predetermined axis with respect to a plurality of observation points having the phase difference data.

(Supplementary Note 3)

The processing apparatus according to supplementary note 1 or 2, wherein the compression unit compresses the data by converting an observation point extracted based on a distance between the axis and the observation point into the point on the axis.

(Supplementary Note 4)

The processing apparatus according to any one of supplementary notes 1 to 3, wherein the removal unit determines an outlier satisfying a predetermined condition in the data compressed by the compression unit and removes data having the determined outlier as the noise component.

(Supplementary Note 5)

The processing apparatus according to any one of supplementary notes 1 to 4, further comprising:

an interpolation unit configured to perform predetermined interpolation processing with respect to the phase difference data with the noise component removed therefrom by the removal unit; and an unwrapping processing unit configured to perform unwrapping processing, which is processing for connecting wrapped phase differences, with respect to the data subjected to the interpolation processing by the interpolation unit.

(Supplementary Note 6)

The processing apparatus according to supplementary note 5, wherein the interpolation unit determines a portion in which the data is sparse in an axial direction based on a distribution of the data and interpolates in the determined sparse portion.

(Supplementary Note 7)

The processing apparatus according to supplementary note 5 or 6, wherein the interpolation unit determines a turnaround portion based on a phase difference between pieces of data adjacent to each other and performs the interpolation processing according to a result of the determination.

(Supplementary Note 8)

The processing apparatus according to any one of supplementary notes 1 to 7, wherein the compression unit compresses the data by compressing at least the positional information with respect to the phase difference data corresponding to a PS (Persistent Scatterer) point extracted based on a predetermined condition in the phase difference data.

(Supplementary Note 9)

A processing method comprising:

causing an information processing apparatus to compress data by compressing at least positional information with respect to phase difference data including the positional information, and remove a noise component with respect to the compressed data.

(Supplementary Note 10)

A program for causing an information processing apparatus to realize processing comprising:

compressing data by compressing at least positional information with respect to phase difference data including the positional information; and removing a noise component with respect to the compressed data.

Note that the program disclosed in each of the above-described example embodiments and the supplementary notes is, for example, stored in a storage device or recorded in a computer-readable recording medium. For example, the recording medium is a portable medium such as a flexible disk, an optical disk, a magneto-optical disk, or a semiconductor memory.

Having described the present invention with reference to the above-described example embodiments, the present invention is not limited to the above-described example embodiments. The form and details of the present invention can be changed within the scope of the present invention in various manners that can be understood by those skilled in the art.

REFERENCE SIGNS LIST 100 processing system
200 processing apparatus
210 operation input unit
220 screen display unit
230 communication I/F unit
240 storage unit
241 dimensional data information
242 phase difference information
243 observation point information
244 processing resultant data information
245 program
240 arithmetic processing unit
251 acquisition unit
252 compression unit
253 noise removal unit
254 interpolation unit
255 unwrapping processing unit
256 output unit
300 processing apparatus
301 CPU 302 ROM
303 RAM
304 program group
305 storage device
306 drive device
307 communication interface
308 input/output interface
309 bus
310 recording medium
311 communication network
321 compression unit
322 removal unit

The invention claimed is:

1. A processing apparatus comprising:

at least one memory configured to store processing instructions; and at least one processor configured to execute the processing instructions to:

compress data by compressing at least positional information with respect to phase difference data including the positional information;

remove a noise component with respect to the compressed data;

perform predetermined interpolation processing with respect to the phase difference data with the noise component removed therefrom;

perform unwrapping processing, which is processing for connecting wrapped phase differences, with respect to the data subjected to the interpolation processing; and determine a turnaround portion based on a phase difference between pieces of data adjacent to each other and perform the interpolation processing according to a result of the determination.

2. The processing apparatus according to claim 1, wherein the at least one processor is configured to execute the processing instructions to:

compress the data by converting an observation point present in a multidimensional space into a point on a predetermined axis with respect to a plurality of observation points having the phase difference data.

3. The processing apparatus according to claim 1, wherein the at least one processor is configured to execute the processing instructions to:

compress the data by converting an observation point extracted based on a distance between an axis and the observation point into a point on the axis.

4. The processing apparatus according to claim 1, wherein the at least one processor is configured to execute the processing instructions to:

determine an outlier satisfying a predetermined condition in the data compressed by the compression unit and remove data having the determined outlier as the noise component.

5. The processing apparatus according to claim 1, wherein the at least one processor is configured to execute the processing instructions to:

determine a portion in which the data is sparse in an axial direction based on a distribution of the data and interpolate in the determined sparse portion.

6. The processing apparatus according to claim 1, wherein the at least one processor is configured to execute the processing instructions to:

compress the data by compressing at least the positional information with respect to the phase difference data corresponding to a PS (Persistent Scatterer) point extracted based on a predetermined condition in the phase difference data.

7. A processing method comprising:

causing an information processing apparatus to compress data by compressing at least positional information with respect to phase difference data including the positional information, remove a noise component with respect to the compressed data;

perform predetermined interpolation processing with respect to the phase difference data with the noise component removed therefrom;

perform unwrapping processing, which is processing for connecting wrapped phase differences, with respect to the data subjected to the interpolation processing; and determine a turnaround portion based on a phase difference between pieces of data adjacent to each other and perform the interpolation processing according to a result of the determination.

8. A non-transitory computer-readable recording medium with a program recorded thereon, the program comprising instructions for causing an information processing apparatus to perform operations comprising:

compressing data by compressing at least positional information with respect to phase difference data including the positional information;

removing a noise component with respect to the compressed data;

perform predetermined interpolation processing with respect to the phase difference data with the noise component removed therefrom;

perform unwrapping processing, which is processing for connecting wrapped phase differences, with respect to the data subjected to the interpolation processing; and determine a turnaround portion based on a phase difference between pieces of data adjacent to each other and perform the interpolation processing according to a result of the determination.

\* \* \* \* \*